May 16, 1961 J. BRONSTEIN ET AL 2,984,741

SENSITIVITY TIME CONTROL SYSTEM

Filed Aug. 8, 1960 2 Sheets-Sheet 1

INVENTORS
JACOB BRONSTEIN
AND SHELDON Z. RAMBO
BY
[signatures]
ATTORNEYS

INVENTORS
JACOB BRONSTEIN
AND SHELDON I. RAMBO
BY
Wade Koontz
and
George Fine
ATTORNEYS United States Patent Office 2,984,741

Patented May 16, 1961

2,984,741

SENSITIVITY TIME CONTROL SYSTEM

Jacob Bronstein and Sheldon I. Rambo, Baltimore, Md., assignors, by mesne assignments, to the United States of America as represented by the Secretary of the Air Force Filed Aug. 8, 1960, Ser. No. 48,338

5 Claims. (Cl. 250—20)

The present invention relates to a system for controlling the sensitivity of multiple receivers with time and more particularly to a system wherein the sensitivity time control is common to aforesaid multiple receivers.

The ideal objective of sensitivity time control in radar systems is to vary the receiver gain in such a manner that targets of the same effective area will appear on the screen of a planned position indicator associated with said radar with the same intensity regardless of range. Considerable reduction in ground or sea clutter results from the technique. The sensitivity time control circuit is normally triggered at each transmitted pulse thus reducing the receiver gain to a predetermined value. Then the gain is allowed to rise in a manner to approximate the instant echo intensity characteristic specified above.

The prior art sensitivity time control circuits apply a time varying signal to gain controlled stages in the receiver intermediate frequency stage or video amplifier. This method is acceptable where only a single receiver channel is involved. However, where it is necessary to control the gain of several receiver channels simultaneously and have the gains match accurately for each increment of time as for stacked beam height finders this system breaks down. It becomes extremely difficult in these cases to match the gain functions of several parallel channels with sufficient accuracy to permit accurate height finding.

The limitations of the prior art has been overcome in our novel sensitivity time control system by controlling the common element to all receiver channels, namely, the local oscillator input to the several receiver mixers, rather than the individual IF or video gains of the receivers. By varying the local oscillator mixer injection, the mixer conversion loss can be made to vary in an approximately linear fashion. By proper choice of mixer crystals, the gain of several receivers can be made to vary with time more nearly identically than in prior art systems.

Our invention further provides a single waveform generator, a single attenuator and a single local oscillator operating in combination to control simultaneously as many parallel receiver channels as desired. This is an improvement of the prior art, as the response of the mixers, associated with aforesaid receiver channels, to a change in local oscillation power input is much more uniform than is the change in transconductance of a vacuum tube due to a change in control grid voltage. Thus a number of channels may all be adjusted initially to have equal gain, and will maintain their equality of gain when a time-varying gain control function is applied. This latter is an important advantage in radar systems which require more than one receiver, all of which must have equal gain.

Another advantage of our invention is that a time-varying gain control function is applied to the local oscillator channel, thus the number of tubes required in each receiver is reduced by at least one or perhaps two. In a multiple channel system, this results in a worthwhile elimination of unnecessary tubes.

It is to be noted that our invention also provides a sensitivity time control for multiple receivers while retaining the linearity and dynamic range of the receivers. In the prior art, a sacrifice of linearity or dynamic range was necessary since gain control was accomplished in the receiver intermediate stage or video amplifier.

It is an object of the present invention to provide a novel sensitivity time control system which is common to multiple receivers.

Another object of the present invention is to provide a common sensitivity time control for multiple receivers wherein the gains of the receivers are controlled simultaneously while the gains of aforesaid receivers match accurately for each increment of time.

Yet another object of the present invention is to provide a sensitivity time control common to multiple receivers while retaining the linearity and dynamic range of aforesaid receivers.

Still another object of the present invention is to provide sensitivity time control common to multiple receivers wherein a single local oscillator is common to the associated mixers of aforesaid multiple receivers.

A still further object of the present invention is to provide a sensitivity time control system common to multiple receivers wherein a time-varying gain control function is applied to aforesaid receivers.

In the accompanying specification, we shall describe, and in the annexed drawings show, what is at present considered a preferred embodiment of our present invention. It is, however, to be clearly understood that we do not wish to be limited to the exact details herein shown and described for purposes of illustration only, inasmuch as changes therein may be made without the exercise of invention and within the true spirit and scope of the claims hereto appended.

Figure 1:
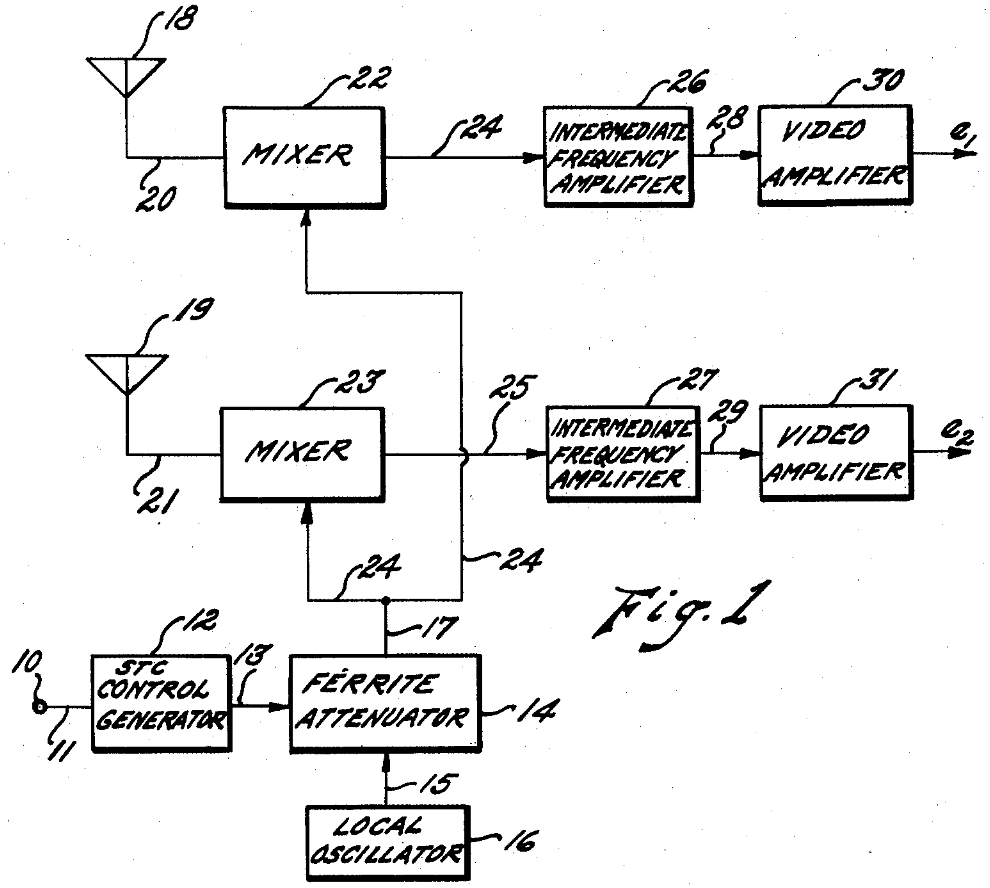
Figure 1 is a block diagram of a sensitivity time control system for multi-channel receivers in accordance with the principles of our present invention.
Figure 2:
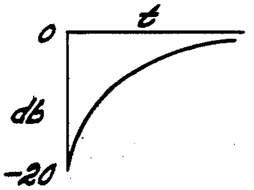
Figure 2 shows the negative exponential curve which is representative of the amplitude of the control signal with time wherein aforesaid control signal is applied to the attenuator by way of the sensitivity time control generator.

Referring now more in detail to the aforesaid preferred embodiment of our present invention with particular reference to the block diagram of Figure 1, terminal 10 receives a synchronization pulse which is then applied to sensitivity time control generator 12 by way of line 11. The aforesaid pulse may be provided by a master synchronizer which is conventionally utilized in radar systems and said pulse is coincident with the start of the radar sweep period. Each synchronizing pulse triggers the sensitivity time control generator 12 which in turn generates a single negative exponential current waveform for each synchronzing pulse. The negative exponential waveform is illustrated in Figure 2. Any conventional exponential waveform generator may be utilized such as the type shown and described in Radiation Laboratory Series, vol. 14, pages 297–301, published by McGraw-Hill Book Company, Inc., 1949.

The negative exponential waveform from generator 12 is applied to ferrite attenuator 14 by way of line 13 and the attenuation thereof is controlled in accordance with the applied waveform, thus the attenuation thereof varies initially from a maximum to a minimum. Ferrite attenuator 14 is varied as a function of time by means of the negative exponential current waveform applied thereto.

Local oscillator 16 generates a C.W. constant amplitude signal which is applied to ferrite attenuator 14 by way of line 15. The output signal from ferrite attenuator 14, which appears on line 17, is then a C.W. signal whose amplitude varies in accordance with aforesaid exponential negative waveform which controls the attenuation of ferrite attenuator 14 as hereinbefore described. The magnitude of the C.W. signal output appearing on line 17 varies with time from a minimum and then gradually returns in exponential form to the amplitude prevailing at local oscillator 16 output which is line 15.

Antennas 18 and 19 receive target signals and apply them by way of lines 20 and 21 to mixers 22 and 23, respectively. The C.W. signal from attenuator 14 is applied to mixers 22 and 23 by way of lines 17 and 24. The time varying function supplied to mixers 22 and 23 is identical by reason of the identical time-varying C.W. signal being applied thereto. Thus the amplitude of the output signals from mixers 22 and 23 will vary in accordance with the amplitude of the C.W. signal applied to said mixers and aforesaid variations will be identical for each of the mixer output signals. It is to be noted that by varying the local oscillator mixer injection, the mixer conversion loss can be made to vary in a linear fashion and by proper choice of mixer crystals, the gain of several receivers which include aforesaid mixers can be made to vary identically with time.

Figure 3:
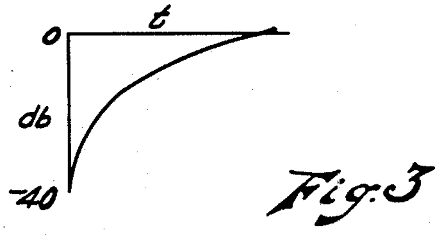
Figure 3 shows the amplitude curve of the receiver's output signals against time.

The output signals from mixers 22 and 23 are fed by way of lines 24 and 25 to intermediate frequency amplifiers 26 and 27, respectively. The I.F. amplified signals are fed by way of lines 28 and 29 to video amplifiers 30 and 31, respectively. The output signals from video amplifiers 30 and 31 are hereinafter described as $e_1$ and $e_2$, respectively. The voltages $e_1$ and $e_2$ vary simultaneously in amplitude with time in accordance with the amplitude of the common C.W. control signal being fed to mixers 22 and 23, respectively. The curve of the amplitude of the voltage $e_1$ and $e_2$ against time is illustrated in Figure 3. It is to be noted that the curve illustrated in Figure 3 is similar to that illustrated in Figure 2.

Figure 4:
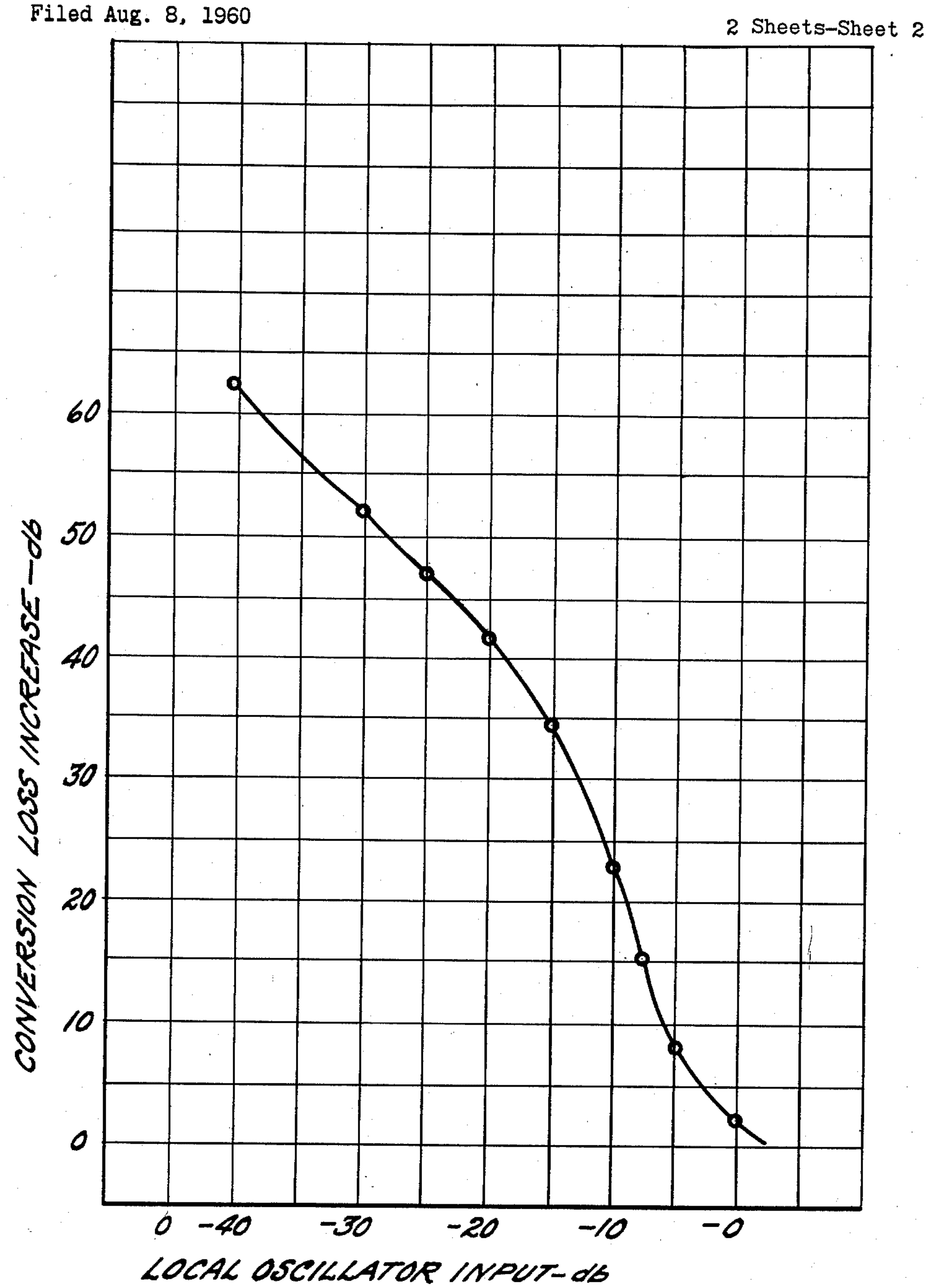
Figure 4 shows the variation of mixer crystal conversion loss with local oscillator input.

Figure 4 shows the variation of mixer crystals conversion loss with local oscillator input. It is seen from this curve that a variation of approximately 20 db output results in a conversion loss variation of approximately 40 db.

By the utilization of a single STC control generator, a single ferrite attenuator and a single local oscillator, as many parallel receiver channels as desired may be controlled simultaneously. Thus, a number of receiver channels may all be adjusted initially to have equal gain, and they will maintain their equality when a common time-varying gain control function is applied thereto.

Other objects and advantages of our present invention will readily occur to those skilled in the art to which the same relates.

We claim:

1. In a sensitivity time control system for a radar having multiple receivers comprising separate mixer means for each of said receiver, means to apply to each of said mixers separate radar target signals, a local oscillator common to each of said mixers for generation of an injection signal for said mixers, means to generate a separate control signal for each synchronization pulse received from said radar, each of said control signals varying exponentially in amplitude, ferrite means to attenuate said injection signal in accordance with said control signal prior to application to said mixer, and means to amplify each of the output signals from each of said mixers.

2. In a sensitivity time control system for a radar having multiple receivers comprising separate mixer means for each of said multiple receivers, means to apply separate radar target signals to each of said mixers, local oscillator means common to and generating an injection signal for said mixers, means for generating a control signal whose amplitude varies exponentially with time, said control signal generator means being actuated by a synchronization pulse from said radar, means to attenuate said injection signal prior to application to each of said mixers in accordance with said control signal, and means to amplify each of the output signals from each of said mixers.

3. In a sensitivity time control system as defined in claim 2 wherein said attenuator means is comprised of a ferrite attenuator.

4. In a sensitivity time control system for a radar having multiple receivers comprising separate mixer means for each of said multiple receivers, means to apply separate radar target signals to each of said mixers, a local oscillator common to and generating an injection signal for said mixers, means for generating a current waveform having the amplitude thereof vary with time in an exponential fashion, said current waveform generator being actuated by synchronization pulses from said radar, a ferrite attenuator to attenuate said injection signal in accordance with said current waveform prior to the application of said injection signal to said mixers, and means to amplify each of the output signals from said mixers.

5. In a sensitivity time control system for a radar having multiple equal gain receivers comprising a separate mixer for each of said receivers, means to apply separate radar signals to each of said mixers, a local oscillator generating a common injection signal for utilization in each of said mixers, means to generate a negative exponential current waveform, said waveform generator being actuated by a synchronization pulse received from said radar, ferrite means to attenuate said common injection signal in accordance with said negative exponential waveform prior to the application of said injection signal to each of said mixers, and means to amplify each of the mixer output signals.

References Cited in the file of this patent

UNITED STATES PATENTS

| | | |
|---|---|---|
| 1,905,946 | Mathieu et al. | Apr. 25, 1933 |
| 2,583,173 | Hargens | Jan. 22, 1952 |
| 2,798,947 | Dodington | July 9, 1957 |

FOREIGN PATENTS

| | | |
|---|---|---|
| 798,060 | Great Britain | July 16, 1958 |